(12) United States Patent
Beer et al.

(10) Patent No.: US 11,927,972 B2
(45) Date of Patent: Mar. 12, 2024

(54) COLLISION AVOIDANCE BASED ON TRAFFIC MANAGEMENT DATA

(71) Applicant: Lawrence Livermore National Security, LLC, Livermore, CA (US)

(72) Inventors: N. Reginald Beer, Pleasanton, CA (US); Jacob Trueblood, Dublin, CA (US); Brian Matthew Wihl, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 456 days.

(21) Appl. No.: 17/103,642

(22) Filed: Nov. 24, 2020

(65) Prior Publication Data

US 2022/0163980 A1    May 26, 2022

(51) Int. Cl.
  *G05D 1/10*   (2006.01)
  *B64C 39/02*  (2023.01)
  *G05D 1/00*   (2006.01)

(52) U.S. Cl.
  CPC ......... *G05D 1/1064* (2019.05); *B64C 39/024* (2013.01); *G05D 1/0088* (2013.01); *B64U 2201/10* (2023.01)

(58) Field of Classification Search
  None
  See application file for complete search history.

(56) References Cited

U.S. PATENT DOCUMENTS

| | | | |
|---|---|---|---|
| 5,006,988 A | 4/1991 | Borenstein et al. | |
| 6,134,502 A | 10/2000 | Sarangapani | |
| 6,712,312 B1 | 3/2004 | Kucik | |
| 8,234,067 B2 | 7/2012 | Bauer et al. | |
| 8,717,223 B2 | 5/2014 | Chambers et al. | |
| 8,761,603 B1 | 6/2014 | Maleki | |

(Continued)

FOREIGN PATENT DOCUMENTS

| | | |
|---|---|---|
| CN | 104407616 A | 3/2015 |
| CN | 105318888 A | 2/2016 |

(Continued)

OTHER PUBLICATIONS

Ahuja et al., "Faster Algorithms for the Shortest Path Problem", Journal Assoc. Comput. Mach., vol. 37, No. 2, Apr. 1990, pp. 213-223.

(Continued)

*Primary Examiner* — Jelani A Smith
*Assistant Examiner* — Davin Seol
(74) *Attorney, Agent, or Firm* — Perkins Coie LLP

(57) ABSTRACT

A system for determining a travel direction that avoids objects when a vehicle travels from a current location to a target location is provided. The system determines a travel direction based on an attract-repel model. The system accesses external object information provided by an external object system. The external object information may include, for each of a plurality of objects, location, type, and constraint. The system assigns a repel value to the location of each object based on the type of and constraint on the object. The system assigns an attractive value to the target location. The system calculates a cumulative force based on the attractive and repulsive forces and sets the travel direction based on the cumulative force.

30 Claims, 9 Drawing Sheets

(56) References Cited

U.S. PATENT DOCUMENTS

| | | | |
|---|---|---|---|
| 8,766,845 | B2 | 7/2014 | Hallquist et al. |
| 9,043,021 | B1 | 5/2015 | Clark et al. |
| 9,102,406 | B2 | 8/2015 | Stark et al. |
| 9,104,201 | B1 | 8/2015 | Pillai et al. |
| 9,137,847 | B1* | 9/2015 | Ayyagari ............ H04W 84/18 |
| 9,407,881 | B2 | 8/2016 | Renkis |
| 9,429,945 | B2 | 8/2016 | Pulleti et al. |
| 9,599,994 | B1 | 3/2017 | Bogdanowicz et al. |
| 9,780,859 | B2 | 10/2017 | Chang et al. |
| 9,798,329 | B2 | 10/2017 | Shattil |
| 9,841,761 | B2 | 12/2017 | Shehata et al. |
| 9,989,965 | B2 | 6/2018 | Cuban et al. |
| 10,107,891 | B1 | 10/2018 | Ngo et al. |
| 10,353,052 | B2 | 7/2019 | Beer et al. |
| 10,956,980 | B1 | 3/2021 | Flick |
| 2004/0017312 | A1 | 1/2004 | Anderson et al. |
| 2006/0184292 | A1 | 8/2006 | Appleby et al. |
| 2006/0293792 | A1 | 12/2006 | Hasegawa et al. |
| 2007/0021880 | A1 | 1/2007 | Appleby et al. |
| 2007/0156286 | A1 | 7/2007 | Yamauchi |
| 2007/0299947 | A1 | 12/2007 | El-damhougy |
| 2010/0042269 | A1 | 2/2010 | Kokkeby et al. |
| 2012/0207476 | A1 | 8/2012 | Agrell et al. |
| 2012/0271461 | A1 | 10/2012 | Spata |
| 2013/0116880 | A1 | 5/2013 | Shitamoto et al. |
| 2013/0162822 | A1 | 6/2013 | Lee et al. |
| 2013/0274986 | A1 | 10/2013 | Trepagnier et al. |
| 2014/0316616 | A1 | 10/2014 | Kugelmass |
| 2015/0234387 | A1 | 8/2015 | Mullan et al. |
| 2015/0336269 | A1 | 11/2015 | Linnell et al. |
| 2015/0336668 | A1 | 11/2015 | Pasko et al. |
| 2016/0070265 | A1 | 3/2016 | Liu et al. |
| 2016/0116915 | A1 | 4/2016 | Pulleti et al. |
| 2016/0140851 | A1 | 5/2016 | Levy et al. |
| 2016/0210863 | A1 | 7/2016 | Kohn-Rich |
| 2016/0327959 | A1 | 11/2016 | Brown et al. |
| 2017/0088130 | A1 | 3/2017 | Suzuki et al. |
| 2017/0097645 | A1 | 4/2017 | Garland |
| 2017/0301249 | A1 | 10/2017 | Kunzi et al. |
| 2017/0301250 | A1 | 10/2017 | Ell et al. |
| 2018/0074174 | A1 | 3/2018 | Beer et al. |
| 2018/0120856 | A1* | 5/2018 | Gabardos ............ G05D 1/0217 |
| 2019/0250641 | A1 | 8/2019 | Beer et al. |
| 2020/0117211 | A1 | 4/2020 | Paglieroni et al. |
| 2020/0354083 | A1* | 11/2020 | Priest ................ G06Q 10/0832 |
| 2021/0088337 | A1* | 3/2021 | Koubaa ................ H04L 67/025 |
| 2021/0272466 | A1* | 9/2021 | Ahn ..................... G08G 5/0021 |
| 2021/0365036 | A1* | 11/2021 | Dix .................... A01D 41/1278 |
| 2022/0051577 | A1* | 2/2022 | Ali ...................... G08G 5/0043 |

FOREIGN PATENT DOCUMENTS

| | | | |
|---|---|---|---|
| EP | 2595024 | A1 | 5/2013 |
| JP | 2006515233 | A | 5/2006 |
| JP | 2009288930 | A * | 12/2009 |
| JP | 2014119901 | A | 6/2014 |
| JP | 2014219723 | A | 11/2014 |
| KR | 20150086065 | A | 7/2015 |
| KR | 1020150136209 | | 12/2015 |
| WO | 2018009189 | A1 | 1/2018 |
| WO | 2018190833 | A1 | 10/2018 |
| WO | 2018190834 | A1 | 10/2018 |
| WO | WO-2018190834 | A1 * | 10/2018 ........... G05D 1/0217 |

OTHER PUBLICATIONS

Bennet, D.J. and C.R. McInnes,"Autonomous Three-Dimensional Formation Flight for a Swarm of Unmanned Aerial Vehicles," J. Guidance, Control, and Dynamics, vol. 34, No. 6, Nov.-Dec. 2011, pp. 1899-1908.

Cavazzuti, M., "Optimization Methods: From Theory to Design," Springer-Verlag Berlin Heidelberg, 2013, chap. 2, pp. 13-56.

Chambers, H., D., "Estimation of time-of-arrivals and contacts," 12 pages.

Chambers, H., D., "Gradient Descent Navigation Method for Collision Avoidance," 9 pages.

Chi, Tieng et al. "A Strategy of Multi-robot Formation and Obstacle Avoidance in Unknown Environment," Proceedings of the IEEE, China, Aug. 2016.

Clark, R. et al., "Autonomous Swarm Testbed with Multiple Quadcopters," Proceedings of the 1st World Congress of Unmanned Systems Engineering, 2014.

Cruz, Y.I., "An Algorithm for Autonomous Formation Obstacle Avoidance," Thesis for Master of Science in Aeronautics and Astronautics, University of Washington, 2013.

Dijkstra "A Note on Two Problems in Connexion with Graphs", Numerische Mathematik, vol. 1, 1959, pp. 269-271.

Examination Report dated Jan. 27, 2021 in European Patent Application No. 16831542.2, 5 pages.

Fink, M. and C. Prada, "Acoustic Time-Reversal Mirrors," Institute of Physics Publishing, Inverse Problems, 17:R1-R38, 2001.

Freedman, et al., "Fibonacci Heaps and their Uses in Improved Network Optimization Algorithms", Journal Assoc. Comput. Mach., vol. 34, No. 3, Jul. 1987, pp. 596-615.

Gageik, et al., "Obstacle Detection and Collision Avoidance for a UAV With Complementary Low-Cost Sensors," IEEE Access, vol. 3, Jun. 2015.

Goerzen, et al., "A Survey of Motion Planning Algorithms from the Perspective of Autonomous UAV Guidance," © Springer Science + Business Media B.V. 2009.

Hart, et al., "A Formal Basis for the Heuristic Determination of Minimum Cost Paths," IEEE, vol. ssc-4, No. 2, Jul. 1968.

Hrabar, "Reactive Obstacle Avoidance for Rotorcraft UAVs, "2011 IEEE/RSJ International Conference on Intelligent Robots and Systems Sep. 25-30, 2011. San Francisco, CA, USA.

International Search Report and Written Opinion for PCT/US2016/041208, dated Mar. 20, 2017, 11 pages.

International Search Report and Written Opinion for PCT/US17/27260, dated Dec. 22, 2017, 20 pages.

International Search Report and Written Opinion for PCT/US17/27253, dated Feb. 2, 2018, 27 pages.

Kendoul, et al., "Survey of Advances in Guidance, Navigation, and Control of Unmanned Rotorcraft Systems," Journal of Field Robotics 29(2), 315-378 (2012).

Khatib, "The potential filed approach and operational space formulation in robot control," Proc. Fourth Yale Workshop on Applications of Adaptive Systems Theory Yale University, May 1985.

Kuhn, H., W., "The Hungarian Method for the Assignment Problem", Naval Research Logistics Quarterly, vol. 2, 1955, pp. 83-97.

Kushleyev, A. et al., "Towards A Swarm of Agile Micro Quadrotors," GRASP Lab, University of Pennsylvania, 2013.

Lum, C. et al., "Formation Flight of Swarms of Autonomous Vehicles In Obstructed Environments Using Vector Field Navigation," University of Washington, 2012.

Luque-Vega, et al., "Distributed Control for Multiple Quadrotors with Obstacle Avoidance Using Potential Fields, "WAC 2016 1570244885.

Martin, et al., "Robot Evidence Grids, "The Robotics Institute Carnegie Mellon University Pittsburgh, Mar. 1996.

Masoud, "Kinodynamic Motion Planning," IEEE Robotics & Automation Magazine, Mar. 2010.

Maurer, C., et al., "A Linear Time Algorithm for Computing Exact Euclidean Distance Transforms of Binary Images in Arbitrary Dimensions," IEEE Transactions on Pattern Analysis and Machine Intelligence, vol. 25, No. 2, Feb. 2003, pp. 265-270.

Ong, M. S., "A Mission Planning Expert System with Three Dimensional Path Optimization for the NPS Model 2 Autonomous Underwater Vehicle", Naval Postgraduate School, Theses and Dissertations, Jun. 1990, California, 194 pages.

Ong, S.M. "Calhoun: The NPS Institutional Archive Theses and Dissertations Thesis and Dissertation Collection A Mission Planning Expert System with Three-Dimensional Path Optimization for the NPS Model 2 Autonomous Underwater Vehicle", Jun. 1, 1990.

(56) References Cited

OTHER PUBLICATIONS

Orlin, B., J., et al., "New Scaling Algorithms for the Assignment and Minimum Cycle Mean Problems", Mathematical Programming, vol. 54, 1992, pp. 41-56.

Ouellet D. et al., "Control of Swarms of Autonomous Robots Using Model Driven Development—A State-Based Approach," IEEE 2011, 8 pages.

Paglieroni, D., et al., "Matching Random Tree Models of Spatio-Temporal Patterns to Tables or Graphs", Proceedings IEEE Conference on Computational Intelligence and Data Mining (CIDM), Honolulu, HI, Apr. 1-5, 2007, pp. 560-567.

Paglieroni, D., et al., "A Unified Distance Transform Algorithm and Architecture," Machine Vision and Applications, vol. 5, Issue 1, 1992, pp. 47-55.

Paul et al. "UAV Formation Flight using 3D potential Filed," Department of Engineering Cybernetics, Norway, 2008.

Rizqi et al. "Path Planning and Formation Control via Potential Function for UAV Quadrotor," ARIS 2014, Taipei, Taiwan.

Rosenfeld, et al., "Sequential Operations in Digital Picture Processing," Journal of the Association for Computing Machinery, vol. 13, No. 4, 1966, pp. 471-494.

Scherer, et al., "Flying Fast and Low Among Obstacles: Methodology and Experiments," The International Journal of Robotics Research vol. 27, No. 5, May 2008, pp. 549-574.

Second Notice of Preliminary Rejection dated Feb. 26, 2021 in Korean Patent Application No. 10-2019-7003709 with English translation, 15 pages . . . .

Sfeir, J., et al., "An Improved Artificial Potential Field Approach to Real-Time Mobile Robot Path Planning in an Unknown Environment", 978-1-4577-0820, IEEE, Jul. 2011.

Vasarhelvyi, G. et al., "Outdoor Flocking and Formation Flight with Autonomous Aerial Robots," MT-ELTE Research Group for Statistical and Biological Physics, Budapest, Hungary, 2014.

Xu, Shengdong et al. "Real Time 3D Navigation for Autonomous Vision-Guided MAVs," IEE/RSJ 978-1-4799-9994-1/15, 2015, Hamburg, Germany.

Xue, Z. and J. Zeng, "Formation Control Numerical Simulations of Geometric Patterns for Unmanned Autonomous Vehicles with Swarm Dynamical Methodologies," 2009 International Conference on Measuring Technology and Mechatronics Atuomation, 6 pages.

Yan et al. "Path Planning in Complex 3D Environment Using a Probabilistic Roadmap Method," International Journal of Automation and Computing, 10(6), Dec. 2013, 525-533.

Yudong Zhang et al: "UCAV Path Planning by Fitness-Scaling Adaptive Chaotic Particle Swarm Optimization", Mathematical Problems in Engineering, vol. 2013, No. 9, Jun. 28, 2013 (Jun. 28, 2013), pp. 1-9.

Zelek, "Dynamic Path Planning," Centre for Intelligent Machines & Dept. of Electrical Engineering McGill University, Montreal, Quebec, Canada, H3A 2A7.

Song Gwang Yul "System and method for path planning for autonomous navigation of driverless ground vehicle" (Year: 2015).

\* cited by examiner

COLLISION AVOIDANCE BASED ON TRAFFIC MANAGEMENT DATA

STATEMENT REGARDING FEDERALLY SPONSORED RESEARCH

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

Unmanned aerial vehicles ("UAVs"), also referred to as unmanned aircraft systems ("UAS") or drones, are employed for a wide variety of applications such as military, scientific, commercial, humanitarian, and recreational applications. UAVs can be controlled in various ways that range from autonomous control by a navigation system to remote control by an operator. The navigation (or guidance) systems that provide autonomous control may be on board the UAVs or at ground stations that receive data from the UAVs and transmit instructions to the UAVs. A navigation system may simply navigate the UAV to a destination location along a specified route (e.g., a straight line) defined by Global Positioning System ("GPS") coordinates. More sophisticated navigation systems may interface with an onboard imaging system that collects images of the environment near the UAV. The navigation system may process the images to identify obstacles in the way of the UAV (e.g., buildings, mountains, and trees) and direct the UAV on a route to avoid the obstacles. When a UAV is under remote control of an operator, the UAV may have an onboard camera system that streams images of the environment to the operator. If the UAV does not have an onboard camera system, the operator needs to have a line of sight to the UAV. The operator may use various cockpit-type controls to guide the UAV.

Navigation systems that process images to identify obstacles can be very expensive and can add significant weight to a UAV. These navigation systems include camera systems, image processing systems, obstacle detection systems, route planning systems, and so on. A significant portion of the expense is driven by the computational and storage resources that are needed to process the images. Each image may require tens of megabytes for storage. To process the images in real time, the navigation systems may require high-end processing systems and custom-designed processors. The expense and weight of such navigation systems make them impractical for use by UAVs except in high-end military applications. As a result, UAVs for commercial and recreational use are remotely controlled based on having a line of sight to the UAVs.

DETAILED DESCRIPTION

Figure 1:
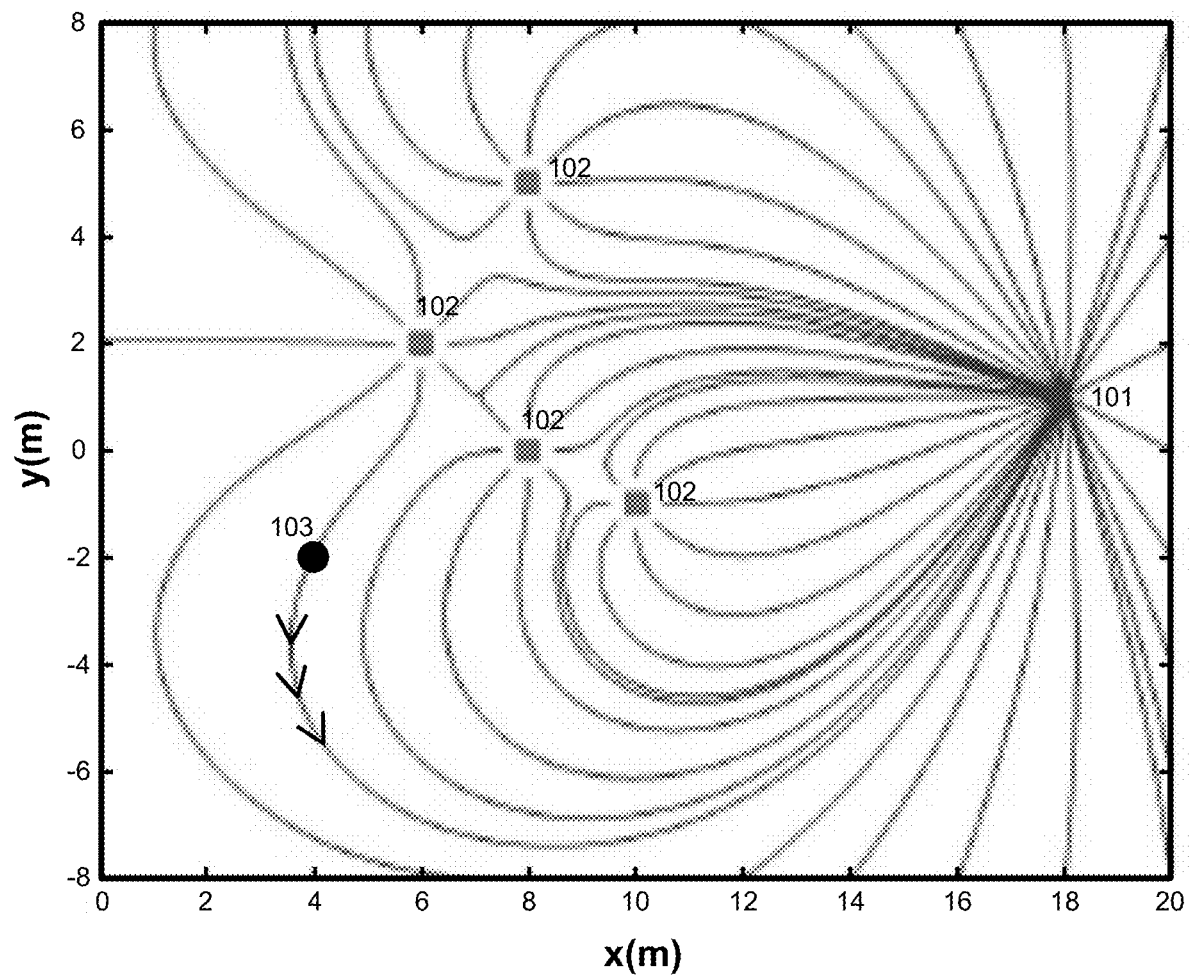
FIG. 1 illustrates one configuration of field lines.

A method and system for determining a travel direction that avoids objects when traveling from a current location to a target location is provided. In some embodiments, an attract-repel path planner ("ARPP") system determines at collection intervals a travel direction for a vehicle to travel to a target or destination location so that the objects are avoided based on an attract-repel model. At intervals ("collection intervals"), the ARPP system receives object locations of objects that are to be avoided. The object locations are identified based on data collected by a sensor array and/or provided by an external object system. The sensor array transmits signals at each collection interval and collects return signals, which are transmitted signals reflected by objects. Each object location specifies a single point in space that is determined based, at least in part, on travel time of a return signal and direction of a return signal or that is provided by an external object system. An object is anything or any area that the vehicle is to avoid such as walls, ceilings, floors, doors, cabinets, buildings, power lines, bridges, plants, equipment, people, the ground, certain elevations, exclusion zones, other vehicles, and so on. The ARPP system assigns a repel value to the object location of each object. A repel value is a measure of a repulsive force that the object at the object location is considered to exert. The repulsive force increases as the distance from the object location decreases. The repulsive force is in directions that extends radially from the object location.

The external object system, such as an aircraft management system or the Unmanned Aircraft System Traffic Management (UTM) system provides external object information on objects such as the location and velocity of an object, the type of an object, the status of the object, and an object identifier for object. The object types may include fixed-wings aircraft, medical helicopter, private helicopter, UAV, unmanned ground vehicle (UGV), delivery truck, and so on. The object status may be fuel level, online or offline (e.g., communication up or down), and so on. The external object system may update and publish the external object information at update intervals so that the current external object information is available to the ARPP system. The external object system may store the external object information in a datacenter so that it can be retrieved by the ARPP system or may send external object information to the ARPP system.

Similar to detected objects, the ARPP system assigns repel values to the location of each external object. The repel value of the object location may be based on various object factors such as type, velocity, and status of the object, constraints on the object, certainty of the location, and confidence in the information received. For example, a medical helicopter may be given a larger repel value than a delivery UAV to help ensure that the medical helicopter has a clear travel airspace and does not need to adjust its flight path to avoid other aircraft. A jet may have its repel value increased to help prevent UAVs from, for example, getting sucked into an intake system of a jet engine. A highly maneuverable UAV may have its repel value increased because the travel direction can change quickly. As another example, a military drone that is traveling at a high speed in the direction of the vehicle may be given a large repel value. A constraint on an object may be whether it is a fixed-wing or a rotary aircraft. Another constraint may be based on the flight ceiling for the aircraft or restricted airspace (e.g., near an airport). For example, a private UAV may have a flight ceiling of 400 meters. If a UAV is near to and traveling toward the flight ceiling, the UAV will need to change its travel direction to stay below the flight ceiling. In such a case, the ARPP system may give the UAV a large repel value because of the uncertainty in what the changed travel direction will be. The confidence in the external object information may vary based on type of sensor (e.g., LIDAR or camera) used to collect location and velocity and time since information was last received. If the confidence for an object is low, its repel value may be increased.

In some embodiments, the ARPP system may both detect an object and receive the external object information for that object. If the detected and external object locations are within a threshold distance, the ARPP system may be more certain of its location and decrease the repel values for the object location. Also, the ARPP system may assume that the object locations of detected objects are more certain than object locations of the external object information, or vice versa. The ARPP system may assign smaller repel values to the object locations that are more certain.

Various algorithms may be used to determine the repel values. For example, each object may be assigned the same initial repel value. The ARPP system may define a multiplication value for object factors. For example, object factors may include object type and object constraints. A multiplication value for a UAV that is fixed wing may be 1.5, and a multiplication value for a UAV that is near its flight ceiling may be 1.1. The multiplication factors may be established by a person. Alternatively, the multiplication factors may be established using various machine learning techniques (e.g., neural network or support vector machine). For example, object motion can be tracked over time and input to a neural network that has been trained to identify objects, then a multiplication factor can be applied depending on the object class reported by the neural network. Additionally, a neural network can be trained to directly assign appropriate repel values according to object motion. Lower complexity algorithms can be used as well, such as the history of an object's displacement being input into an algebraic expression to determine the multiplication factor.

The ARPP system also assigns an attract value to the target location, which may change overtime (e.g., a moving target). An attract value is a measure of an attractive force that a target at the target location is considered to exert. The attractive force increases as the distance from the target location decreases. The attractive force is in directions that extend radially from the target location. For example, the objects may be modeled as having positive electrostatic charges, and the repel values may represent the magnitude (e.g., in Coulombs) of the positive electrostatic charges. The target may be modeled as having a negative electrostatic charge, and the attract value may represent the magnitude of the negative electrostatic charge.

After assigning the repel values and the attract value, the ARPP system calculates an attract-repel vector having an attract-repel magnitude and an attract-repel direction for the current location based on the repel values and their directions and the attract value and its direction. The attract-repel field for the current location is a vector that represents the cumulative force of the repulsive forces and the attractive force at the current location and the cumulative direction of the cumulative force at the current location. For example, with the forces modeled as electrostatic charges, the attract-repel field for the current location is represented by the electric field at the current location. The ARPP system determines the travel direction for a vehicle at the current location to be the direction of the attract-repel field at the current location. The ARPP system then provides the travel direction so that the vehicle can travel in the travel direction until the next interval.

In some embodiments, the ARPP system may also generate predictions of the locations where each moving object will be at later times and assign a repel value to those predicted locations. For example, the ARPP system may predict where an object will be at several prediction intervals such as one, two, and three seconds from the current time. The prediction intervals may be decreased when fast moving objects (e.g., 0.1 seconds) are present and increased when fast moving objects are not present. (e.g., 1.5 seconds). The predicted locations may be considered more uncertain the further out the prediction interval because the object has more time to move in a manner that is not consistent with the predictions. For example, a predicted location for a third prediction interval will be more uncertain than for the first prediction interval because the object has a longer opportunity to change course. Because of this uncertainty, the ARPP system may assign increasingly smaller repel values to predicted locations of later prediction intervals. For example, the repel value for a prediction location at a prediction interval of one second and three seconds may be 70% and 25%, respectively, of the repel value for the current location of the object.

In some embodiments, an object location corresponds to a "contact point" that represents the sources of the reflected pulses (e.g., a radar reflection). A contact point could be generated by a reflection from a point-like object, moving or stationary, by specular reflection from the surface of a larger object, or by a reflection from the edge or corner of a larger object. These possibilities, in general, cannot be distinguished from a single collection of the radar. They might be distinguishable by tracking how the contact points move over multiple radar looks as the vehicle moves. Nevertheless, the primary use of the contact points is to provide information to the vehicle about regions to avoid as it navigates toward a target such as predetermined location or a moving landing platform (e.g., truck on which UAVs takeoff from and land on). If an object is large (e.g., a building or a bridge), the object detection system may represent the "object" as a collection of object locations. For example, a building with a base that is 20 square meters and a height of 50 meters be represented by 100 objects on the faces of the building.

In some embodiments, the ARPP system may employ various force laws to determine travel direction for a vehicle. Suitable force laws may include Coulomb's law, Voronoi fields (Dmitri Dolgov, Sebastian Thrun, Michael Montemerlo, James Diebel, "Practical Search Techniques in Path Planning for Autonomous Driving," Proceedings of the First International Symposium on Search Techniques in Artificial Intelligence and Robotics, June 2008), and Maxwell's equations (A. M. Hussein and A. Elnagar, "Motion Planning Using Maxwell's Equations," Proceedings of the 2002 IEEE/RSJ International Conference on Intelligent Robots and Systems, October 2002).

In some embodiments, the ARPP system employs an analogy from the physics of electric fields produced by static charge distributions to determine travel direction for a vehicle at a given time. A review of some properties of the physics of static charges is provided. The force between two point charges $Q_a$ and $Q_b$ is given by Coulomb's law, as illustrated by Equation 1:

$$F_{ab} = \frac{1}{4\pi\varepsilon_0} \frac{Q_a Q_b}{r^2} \hat{r}, \quad \hat{r} = \frac{(x_b, y_b, z_b)}{r} \quad (1)$$

where $\varepsilon_0$ is the permittivity of free space, r is the distance between the two point charges, $(x_b, y_b, z_b)$ are the coordinates of charge $Q_b$ relative to charge $Q_a$, and $\hat{r}$ is the unit vector specifying the direction from $Q_a$ to $Q_b$. (See Electromagnetic Fields and Waves, Paul Lorrain and Dale Corson, W. H. Freeman and Company, San Francisco, 1970.) The electrostatic force equation represented by Equation 1 and the universal gravitational equation have the same form, but the ARPP system employs the electrostatic model because both positive and negative charges are needed to represent the attractive and repulsive forces. This vector is defined so that the force between the two charges is repulsive when the charges are the same sign (e.g., both positive), and attractive when they are opposite signs. The electric field at $Q_b$ produced by $Q_a$ is the force per unit charge, $E_a = F_{ab}/Q_b$. It is often convenient to represent the electric field as the gradient of a potential $V_a$ at any given point, as illustrated by Equation 2:

$$E_a = -\nabla V_a, \quad V_a = \frac{Q_a}{4\pi\varepsilon_0 r}, \quad \nabla = \left(\frac{\partial}{\partial x}, \frac{\partial}{\partial y}, \frac{\partial}{\partial z}\right) \quad (2)$$

For a distribution of point charges, the electric or potential fields from each charge can be summed to obtain the total fields. More generally, if $\rho(r)$ is the charge density in space, the electric and potential fields are solutions of the partial differential equation of Equation 3:

$$\nabla \cdot E = -\nabla^2 V = \frac{\rho(r)}{\varepsilon_0}, \quad \nabla^2 = \frac{\partial^2}{\partial x^2} + \frac{\partial^2}{\partial y^2} + \frac{\partial^2}{\partial z^2} \quad (3)$$

This equation states that the divergence of the electric field and the Laplacian of the potential are proportional to the charge distribution. In regions of space with no charge ($\rho=0$), the divergence of the electric field is zero—that is, every field line that enters the region also exits the region. Furthermore, the Laplacian of the potential is zero, which means that the minimum or maximum of the potential in a given region occurs at the boundary of the region—that is, there are no local minima or maxima of the potential inside a region with no charge. The field line at any given point is tangent to the direction of the electric field and is also the direction of maximum gradient of the potential. Field lines begin and end at charges or the point at infinity. By convention, field lines originate at positive charges and terminate at negative charges. If there are equal amounts of positive and negative charge, then all field lines will originate at positive charges and terminate at negative charges; no field lines will extend to infinity. FIG. 1 illustrates one configuration of field lines. The electric field lines for a configuration of four positive charges 102 and one large negative charge 101 is illustrated. The field lines radiate away from the positive charges and converge to the negative charge.

The ARPP system may use these properties of the electrostatic fields to determine the travel direction for a vehicle. When the ARPP system assigns a positive charge to each object location and a negative charge to the target location, the electric field calculated at the current location will point away from the object location. Moving in this direction, the vehicle will follow the field line away from all object location and eventually end up either at infinity or at the target location. When the ARPP system sets the charge of the target location to be equal or greater in magnitude to the sum of charges of the object location, all the field lines will terminate at the target location and the vehicle will arrive at the target location while avoiding all objects. Because the field direction is the direction of maximum descending gradient of the potential, the ARPP system may be considered to be a gradient descent technique for navigation.

In some embodiments, the ARPP system establishes a travel direction for the vehicle based on the following equations:

$$\frac{s_n - p_{i,n}(t)}{|p_{i,n}(t) - s_n|^3} F^{obj}(t) \quad (4a)$$

$$f_n^{objnet} = \sum_{i=0}^{obj} \sum_{t=0}^{pred} \frac{s_n - p_{i,n}(t)}{|p_{i,n}(t) - s_n|^3} F^{obj}(t) \quad (4b)$$

$$f_n^{tar} = \sum_{t=0}^{pred} \frac{g_n(t) - s_n}{|g_n(t) - s_n|^3} F_n^{tar}(t) \quad (5)$$

$$f_n^{net} = f_n^{objnet} + f_n^{tar} \quad (6)$$

$$s_{n+1} = \hat{f}_n^{net} d + s_n \quad (7)$$

| | |
|---|---|
| obj | number of objects (indexed by i) |
| pred | number of prediction intervals (indexed by t); the current collection interval is considered the first prediction interval at t = 0 |
| n | represents the current collection interval |
| $s_n$ | current location of the vehicle |
| $s_{n+1}$ | next location of the vehicle |
| $p_{i,n}(t)$ | predicted location of object i and at prediction interval t |
| $F^{obj}(t)$ | repulsive force of an object for prediction interval t |
| $f_n^{obj}$ | net repulsive force of the objects at the current location |
| $F_n^{tar}(t)$ | attractive force of the target at prediction interval t |
| $g_n(t)$ | predicted location of the target at prediction interval t |
| $f_n^{tar}$ | net attractive force at the current location |
| $f_n^{net}$ | net attract-repel force at the current vehicle location |
| $\hat{f}_n^{net}$ | direction of net attract-repel force |
| d | distance traveled between collection intervals |

Equation 4a represents the repulsive force at a location. Equation 4b represents the net repulsive force at the current vehicle location. The repulsive force $F^{obj}(t)$ represents that all objects have the same repulsive force function for predicted locations along their predicted paths. Alternatively, a repulsive force function $F_i^{obj}(t)$ may be factor in various characteristics (e.g., velocity) for object i. The ARPP system may also allow their repulsive forces to diminish differently at each prediction interval. For example, one object type may have its repulsive forces diminish linearly over the prediction intervals, and another object type may have its repulsive forces diminish exponentially over the prediction intervals. Equation 5 represents the net attractive force of the target at the current vehicle location. Equation 6 represents the net attract-repel force at the current vehicle location. Equation 7 represents a location in the next travel direction.

Figure 2:
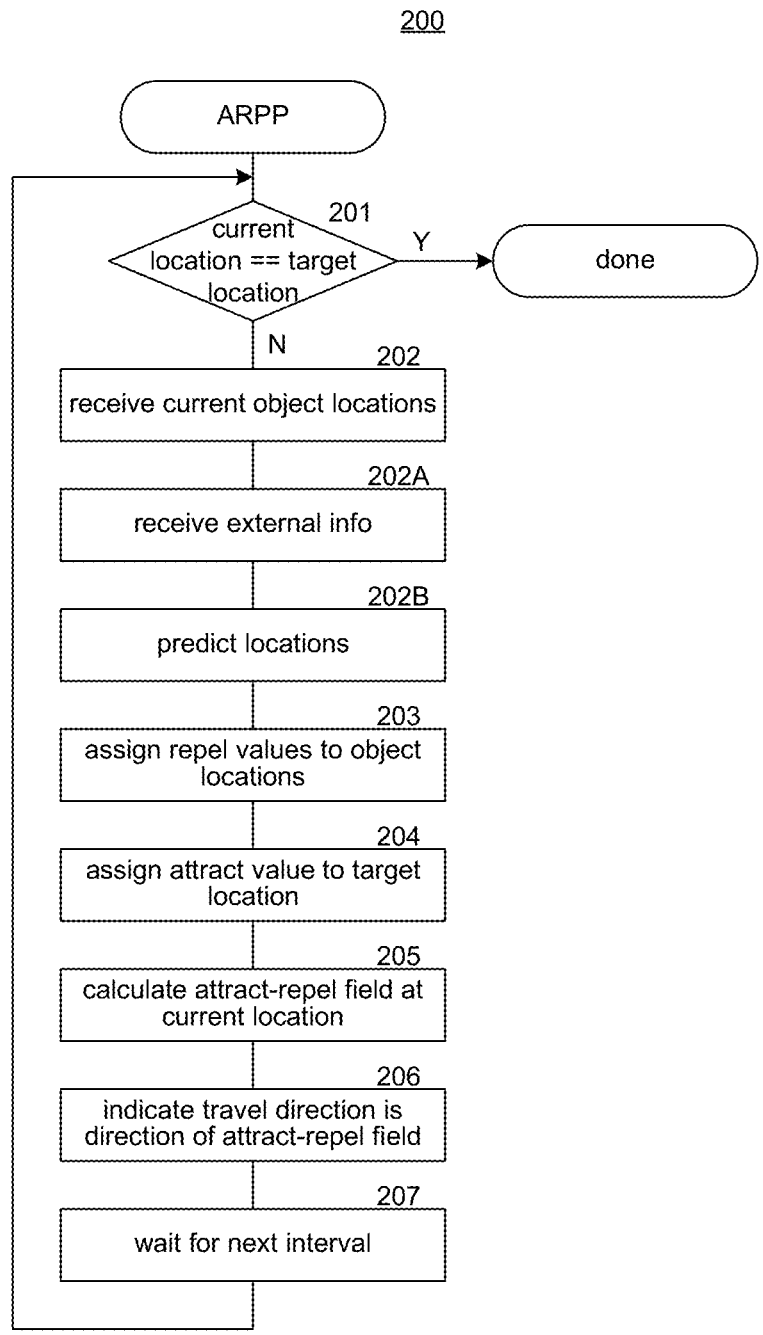
FIG. 2 is a flow diagram that illustrates the overall processing of the ARPP system in some embodiments.

FIG. 2 is a flow diagram that illustrates the overall processing of the ARPP system in some embodiments. The ARPP system 200 repeatedly receives object locations and determines a travel direction until the vehicle arrives at the target location. Referring to FIG. 1, the ARPP system calculates a travel direction for the vehicle 103 that is in the direction of the field (or actually the reverse direction, if objects are assigned a positive charge) at the current location of the vehicle. In decision block 201, if the current location of the vehicle is the same as the target location, then the vehicle has arrived at the target location and the ARPP system completes, else the ARPP system continues at block 202. In block 202, the ARPP system receives the object locations of the objects. In block 202a, the ARPP system receives the external object information. In block 202b, the ARPP system generates a predicted location for each object (e.g., moving object) at various prediction intervals. The ARPP system may also generates a predicted target location for a moving target at various prediction intervals. In block 203, the ARPP system assigns repel values to the current object locations and predicted object locations. For example, the ARPP system may assign repel values representing positive charges that are equal to or close to one for the current object locations and increasingly smaller repel values to the predicted object locations. Alternatively, if the sensor system assigns confidence values to the objects indicating confidence that a detected object is an actual object, the ARPP system may set the charges to be proportional to the confidence value so that contacts with low confidence values have less influence on the path planning than those with high confidence values. In block 204, the ARPP system assigns an attract value to the current target location and (if any) the predicted target locations. For example, the ARPP system may assign an attract value representing a negative charge that is relative to the positive charges assigned to the object location. To help ensure that all field lines terminate at the target location, the attract value may be less than or equal to the negative of the sum of the repel values. Alternatively, the attract value could be greater than the negative of the sum of the repel values because the object locations can change over the intervals as the vehicle travels past objects and the field of perception of the sensor array of the vehicle changes. With a smaller attract value, the objects have more influence on the travel direction—that is, the vehicle avoids the objects with a greater margin, providing a smaller risk tolerance of a collision with an object (e.g., a conservative behavior). With a larger attract value, the objects have less influence on the travel direction—that is, the vehicle avoids the object with a smaller margin, providing a higher risk tolerance of collision with an object (e.g., a risky behavior). In some embodiments, the ARPP system may set the repel values of the object locations based on the distance between the object location and the target location. For example, the ARPP may set a repel value to increase with distance from the target location so that its contribution to the attract-repel field at the vehicle becomes independent of the distance between the current location and the target location.

In block 205, the ARPP system calculates the attract-repel field for the current location. The attract-repel field may be set based on the electric field derived using Coulomb's law. Alternatively, the attract-repel field may be based on repulsive forces and an attractive force that monotonically decrease with distance. In addition, the ARPP system may assign different repel values to each object. For example, the different repel values may be selected for different classes of objects with different risk tolerances, such as moving objects and stationary objects. The repulsive force exerted on a location may decrease faster than the inverse of the square of the distance, such as the cube of the distance. With a faster-decreasing repulsive force, the repulsive force from objects that are farther away is decreased and that are closer is increased. The ARPP system calculates a repel field for the current location based on each repel value and an attract field-based attract value and then sums the fields to give the attract-repel field.

In block 206, the ARPP system indicates that travel direction is the direction of the attract-repel field. The ARPP system also specifies the travel distance to travel in the travel direction. The travel distance may be a constant distance based on experiences traveling in similar environments (e.g., a city with tall buildings or a rural area). The travel distance any also be based on the magnitude of the attract-repel field. A large magnitude means that the current location is closer to an object, so a small travel distance may be appropriate. In block 207, the ARPP system waits for the next interval and then loops to block 201 to repeat the processing.

In some embodiments, the ARPP system may select a travel direction based not only on the received object locations for the current interval, but also on the received object locations for prior intervals. If an object is no longer in the field of perception of the sensor array, then the travel direction may be set to be toward that object. During the next interval, that object may again be in the field of perception and the travel direction may be set to be away from that object. To avoid having the travel direction oscillate between toward and away from that object, the ARPP system may calculate the travel direction based on object locations of prior objects received during prior intervals even though the object location of a prior object is not received for the current interval, because the prior object is no longer in the field of perception. By calculating the travel direction based on the location of such prior objects, the ARPP can avoid such oscillation in travel direction. As the number of prior objects may be quite large, the ARPP system may reduce the repel value that is assigned to the object locations of the prior objects based on the number of intervals since the prior object was last perceived. For example, the ARPP system may assign an exponentially decaying repel value.

In some embodiments, the ARPP system may factor in knowledge of stationary objects such as fixed obstacles (e.g., buildings), ground topography (e.g., mountains), and exclusion zones (e.g., areas surrounding an airport) when assigning repel values. The attract-repel fields at various locations resulting from the repel values assigned to these stationary objects can be pre-calculated. In such a case, the ARPP system need only calculate the attract-repel fields for moving objects or new stationary objects), then sum the newly calculated attract-repel fields and the pre-calculated attract-repel fields for the current location.

In some embodiments, the ARPP system may be part of an object sense and avoid ("OSA") system. The OSA system, which may be onboard a vehicle, may include an object detection system, the ARPP system, and a flight controller system. The OSA system may also include a sensor array that interfaces with the object detection system. The OSA system repeatedly uses the sensor array to collect sensor data of any objects in an object field (i.e., field of perception) around the vehicle. For example, the sensor array may transmit radar signals and receive the return signals that are reflected by the objects. The object detection system then detects the objects and determines their locations based on the sensor data. For example, the object detection system may triangulate the location of an object based on return signals received by multiple sensors. The ARPP system then plans a next travel direction for the vehicle to avoid the detected objects. The OSA system then instructs the vehicle to travel in the travel direction until the process is repeated and a new travel direction is planned that takes into consideration the objects that are currently in the object field.

Although the OSA system that employs the ARPP system is described primarily in the context of a vehicle that is a UAV, the OSA system may be used to control a variety of autonomous vehicles ("AVs") that are autonomously driven. The AVs may include UAVs, unmanned ground vehicles ("UGVs"), unmanned underwater vehicles ("UUVs"), and unmanned space vehicles ("USVs"). These vehicles are "unmanned" in the sense that a person does not control the guidance of the vehicle, irrespective of whether a person is actually on board the vehicle. For example, a UGV may transport several people with the UGV's guidance under the sole control of the OSA system (i.e., autonomously). For UGVs, the attract-repel model may be applied to a 2D environment, rather than a 3D environment. If the UGV is, for example, operating in a parking structure, the attract-repel model may consider the parking structure as a stack of planes—that is, one plane for each level of the parking structure. For UUVs, the sensor array may be sonar-based, but the OSA system would operate in a manner similar to that for UAVs. For USVs, the OSA system may be particularly useful in helping a satellite avoid collisions with space debris or other satellites. The OSA system for USVs may employ a larger field of perception to encompass a wider approach of objects. In addition, the OSA system may be augmented with the estimated locations of known space objects determined from orbital parameters (e.g., Keplerian elements) of the space objects to help in determining whether return signals correspond to an object. In some embodiments, the OSA system may not even employ a sensor array, but rather, may rely solely on the estimated locations of the known space objects such as those estimated from the orbital parameters, retrieved from a geographic information system of objects (e.g., buildings, power lines, and trees), determined on prior traversals, and so on. Also, although the OSA system is described primarily based on a field of perception that is in front of the UV, the field of perception may surround the UV. In such a case, the UV may include multiple sensor arrays to sense the entire area around the vehicle. Such a surrounding field of perception may be useful, for example, to sense and avoid objects (e.g., space debris) that are traveling toward the UV from the rear.

The ARPP system may be employed in an enclosed, partially enclosed, and open environment such as a large building, a college campus, and a military base, city, or construction site. For example, in a large enclosed medical facility, UVs may be employed to move medicine and equipment. In such a case, the objects may be other UVs, stationary equipment, and people. As another example, in a fulfillment center, UAVs and UGVs may be used to stock items, pull items needed to fill an order, move items to a target location for collecting items of an order, and so on. The objects in the fulfillment center may be other UVs (UAVs and UGVs), storage bins, shelving, conveyor systems, and people. Also, the external object system may be a traffic control system for the fulfillment center. In such a case, the UVs may not have sensors and only receive object information from the traffic control system. A target may also be a position on a conveyor belt. In such a case, a traffic control system may provide the location of the position to the UV to deposit or remove an item from the conveyor belt. The convey belt may also have a transmitter at the target location to transmit its location. The traffic control system may employ various sensors (e.g., cameras, GPS sensor on UAV, and LIDAR) to track the locations of the objects. An ARPP system onboard a UV may receive the external object information (e.g., every 0.1 second) and plan the next travel direction. Alternatively, the ARPP system may be part of the traffic control system. In such a case, the traffic control system may send only travel directions to the UVs. More generally, some of the components used to collect object locations and determine travel direction may be located on a UV or in an external datacenter (e.g., a cloud datacenter).

As another example, a large military may have UAVs and UGV equipped with the ARPP system for moving equipment and personnel. The military base may have a diverse perimeter that include forest areas, open spaced, canyons, peaks, and so on. In such a case, UVs equipped with the ARPP system may monitor the perimeters to detect intrusions via land or air. In such a case, the ARPP system establishes repulsive forces to avoid authorized objects (e.g., trees or UVs) and may establish an attractive force for an intruding object to intercept the intruding object.

As another example, the ARPP system may be used on UVs in a city such as UVs for delivering goods, monitoring activity (e.g., a group of people), tracking a vehicle (e.g., of a suspected criminal), and so on. The external object information may include data derived from images collected by traffic cameras, transmitted by emergency vehicles, vehicles with a UAV landing pad (e.g., a target), and so on. For example, the ARPP system use the location of an emergency vehicle and its intended route (provided by the external object system) when assigning repulsive or attractive forces.

The ARPP system may select travel directions so that a UAV takes evasive maneuvers to avoid an imminent collision with an object. For example, a predator UAV may be attempting to intercept a prey UAV before it reaches its target by colliding with the prey UAV. In such a case, the OSA system of the prey UAV may calculate a new travel direction that is more than 90° away from the target direction because the predator UAV moved from to the left of the prey UAV to right in front of the prey UAV. If the prey UAV was traveling in the target direction, the sudden and significant change in the travel direction by the prey UAV is effectively an evasive maneuver to avoid colliding with the predator UAV. The new travel direction may result in the prey UAV rapidly ascending or descending or even reversing direction. If the prey UAV has a surrounding field of perception, then the OSA system can take evasive maneuvers even if the predator UAV approaches from the rear. In such a case, the OSA system may select a travel direction that is close to the target direction but would override the selection because the predator UAV is too close. The OSA system may determine the predator UAV's travel direction based on successive location determinations and set the overriding travel direction to be, for example, perpendicular to the predator UAV's travel direction. If the field of perception was only in front of the prey UAV, the prey UAV may enter an evasive maneuver mode. While in the evasive maneuver mode, the prey UAV may continually orient itself in an attempt to keep the predator UAV within the transit volume while the predator UAV is within the range of the field of perception.

The OSA system may also be used to control movement in robotic systems such as fixed-base robotic systems and free-moving robotic systems. A fixed-base system, such as those used on production lines, typically includes a robot manipulator, an end effector (e.g., tool or gripper), and a safety interlock system. The fixed-base robotic system may be taught its motion using a teach pendant, which is typically a handheld unit used to program the trajectory of the robot. The safety interlock system may include force sensors to detect a collision or a light curtain sensor to disable the robot manipulator when a person is near the workspace of the fixed-base robotic system. The OSA system allows a fixed-base robotic system to detect intrusions and alter the trajectory of the robot manipulator. As a result, worker safety can be improved, and throughput of a capital-intensive production line can be maintained by avoiding costly shutdowns. In addition, use of the OSA system can eliminate the need to teach with a teach pendant and the need for force sensors or a light curtain sensor. The OSA system can be used to determine travel directions for picking up and placing parts for a production line. The OSA system can be used to direct the end effector to a target location of a part within the cell of the fixed-base system for pickup while avoiding neighboring cells, for example, by controlling the roll, pitch, and yaw of the robot manipulator. The OSA system can then be used to direct the end effector to a target that is the desired location of a part on a production line. The output of the OSA system can be used to generate and issue commands to the robot manipulator to slow down, change orientation, or signal readiness to dock, interlock, mate, operate a tool, and so on. A sensor array may be located on the robot manipulator near the end effector or at a fixed location.

Free-moving robotic systems include servant robots and companion robots. The OSA system can be used to generate travel direction when a robot is moving parts or supplies within a hospital, production line, shipping facility, and so on in a manner similar to determining a next travel direction for a UGV. The payload of the free-moving robotic system may be a tool, part, supply, sensing system, interactive communicator (for a companion robot), and so on. The target location is the desired destination of the robot. The desired destination may be a moving target, for example, such as the person that a companion robot is following. The OSA system allows the robot to move to the destination while avoiding stationary and moving objects. A sensor array may be located on the front of a free-moving robotic system. The OSA system may be used to navigate robotic systems safely, efficiently, and reliably through complex environments.

In some embodiments, the object detection system may determine the object location by images collected from a camera. A stereoscopic camera may be used to determine the 3D location of each object. Alternatively, an auto-focus mechanism may provide, for each foreground pixel, the object represented by the pixel. For each image collected, the object detection system applies an algorithm to identify groups of connected pixels that correspond to the same object. The object detection system also may employ an image segmentation technique.

Figure 3:
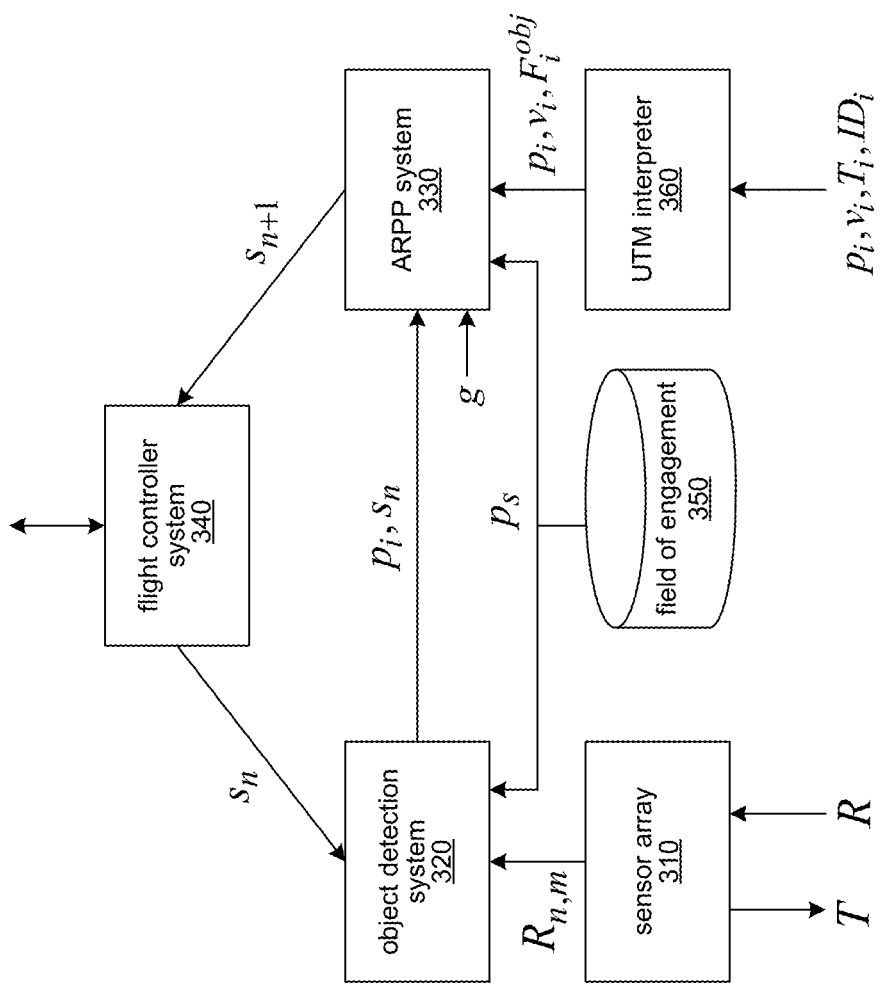
FIG. 3 is a block diagram illustrating components of an OSA system that employs the ARPP system in some embodiments.

FIG. 3 is a block diagram illustrating components of an OSA system that employs the ARPP system in some embodiments. The OSA system 300 includes a sensor array 310, an object detection system 320, an ARPP system 330, a flight controller system 340, a field of engagement store 350, and UTM interpreter 360. The sensor array transmits transmit signals T and receives return signals R. The sensor array provides the return signal $R_{n,m}$ corresponding to time n for receiver m. The object detection system is also provided with the current location relative to a fixed coordinate system as collected by the flight controller system that is converted to a current location $s_n$ of the vehicle. The object detection system provides to the ARPP system the current location of the vehicle and the object location of each detected object $p_i$ for current collection interval n. The UTM interpreter inputs external object information from an external object system. The external object information may include, for each external object, its location $p_i$, velocity $v_i$, object type $T_i$, and its identifier $ID_i$. The UTM interpreter provides to the ARPP system the location $p_i$ and a repulsive force function $F_i^{obj}$ for each external object. The repulsive force function may be based on object type, for example, with a large repulsive force for an external object that is low on fuel or battery power so that the external object can travel to a location in as short as path as possible to refuel or recharge. The ARPP system may also access the field of engagement store 350 to retrieve object locations of known stationary objects $p_s$ (e.g., buildings). The ARPP system is also provided with the target location g. For example, the target location may be 30 meters above a moving vehicle that the vehicle is to track. In such a case, the target location may be calculated based on the current location of the vehicle as reported by a location system (e.g., GPS system) on board the vehicle. The vehicle may also track a moving target using its sensor array. The ARPP system calculates the travel direction and then provides the travel direction to the flight controller system, for example, as a next vehicle location $s_{n+1}$. The flight controller system directs the vehicle to travel in the travel direction. The object detection system, the ARPP system, and the flight controller system repeat their processing at collection intervals to determine the next travel direction given the objects currently in the travel volume.

Figure 4:
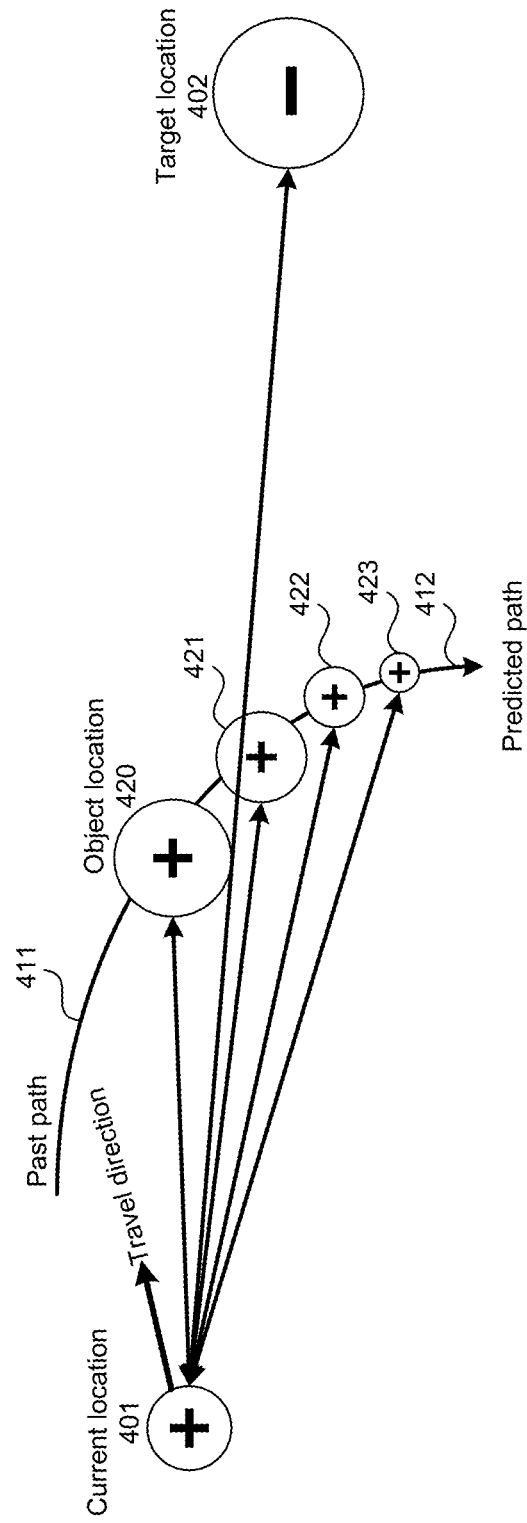
FIG. 4 is a diagram that illustrates the setting of attractive and repulsive forces by the ARPP system.

FIG. 4 is a diagram that illustrates the setting of attractive and repulsive forces by the ARPP system. The vehicle is a current location 401, and target is at target location 402. The object is at current object location 420 and has traveled along past path 411 and is predicted to travel along predicted path 412. The ARPP system generates predicted object locations 421, 422, and 423 for three prediction intervals, for example, one, two, and three seconds, respectively. The radius of the circles represents the magnitude of the attractive force or repulsive force associated with locations. The arrows represent the attract direction and repel direction of the forces. In this example, the magnitude of the repulsive force at the predicted object locations 421, 422, and 423 is smaller as the prediction intervals are farther from the current collection time. The progressively smaller sizes represent increasing uncertainty in the predicted object location at farther out time intervals. The ARPP system may use various algorithms to generate a predicted path. For example, an algorithm may predict direction of the object based on prior locations of the object and generate a predicted path that is a straight line in that direction. A more complex algorithm may employ a Kalman filter to generate predicted paths are curved as described in Prevost, C., Desbiens, A, and Gagnon, E, "Extended Kalman Filter for State Estimation and Trajectory Prediction of a Moving Object Detected by an Unmanned Aerial Vehicle," Proceedings of the 2007 American Control Conference, New York City, USA, Jul. 11-13, 2007, which is hereby incorporated by reference.

In some embodiments, the object detection system and the ARPP system are implemented in software that is executed by an onboard processor of a UAV. The processor may send instructions via a Micro Air Vehicle Communication Protocol ("MAVLink") to an autopilot system of the UAV. The processor and the autopilot system may be connected via a Universal Asynchronous Receiver/Transmitter ("UART") connection. Suitable processors may include, for example, Odroid C1+, Odroid XU4, Raspberry Pi, Intel Edison, Intel NUC, Gigabyte Brix, and NVIDIA Jetson TK1. In some embodiments, aspects of the OSA system may be executed by a processor that is not on board. In such an embodiment, an onboard processor may include a WiFi or cellular (e.g., 5G) interface to receive data from and transmit data to a ground station processor. If the ARPP system is executed by the ground station processor, then the onboard processor transmits the object locations or voxels identified by the objection detection system to the ground station processor and receives the travel directions and possibly the target location from the ground station processor. The onboard processor and the ground station processor may communicate via an Intel WiFi Link 5000 adapter.

In some embodiments, the ARPP system categorizes objects as stationary or moving. For example, a building is a stationary object, and a UV that is traveling is a moving object. A field of perception is a localized volume of the environment sensed by the UV at a given instant of time, which may include stationary and moving objects. A field of engagement is a much larger volume of the environment, which may include only stationary objects. Although a field of engagement can cover a much larger volume than a field of perception, the representation is static (because moving objects are not included), and the accuracy of the stationary objects may be subject to statistical uncertainty.

A radar, sonar, LIDAR, or acoustic-based collision avoidance system for a vehicle typically performs multiple tasks in sequence to sense the surrounding environment, detect stationary and moving objects, and determine an optimal path to avoid collisions. Radar is one approach that offers advantages in simplicity of design and analysis, and the ability to operate at night or in inclement weather. An OSA system consists of an array of radar antennas mounted on the drone, a set of transmitters to generate pulses for the antennas, a receiver system for collecting and amplifying the reflected pulses, and a processor for interpreting the reflections and determining the optimal speed and direction of the vehicle to avoid collisions. Methods for processing received signals are described in PCT Patent Application No. PCT/US16/41208, entitled "Object Sense and Avoid System for Autonomous Vehicles," filed on Jul. 6, 2016, which is hereby incorporated by reference. The output of these methods is a set of contact points (e.g., objects) in space that represent the sources of the reflected pulses. A contact point could be generated by a reflection from a point-like object, moving or stationary, by specular reflection from the surface of a larger object, or by a reflection from the edge or corner of a larger object. These possibilities, in general, cannot be distinguished from a single collection of the radar. They might be distinguishable by tracking how the contact points move over multiple radar looks as the vehicle moves. Nevertheless, the primary use of the contact points is to provide information to the vehicle about regions to avoid as it navigates toward a predetermined location (i.e., the target). If an object is large (e.g., a building or a bridge), the object detection system may represent the "object" as a collection of object locations. For example, a building with a base that is 20 square meters and a height of 50 meters be represented by 100 objects on the faces of the building.

Figure 5:
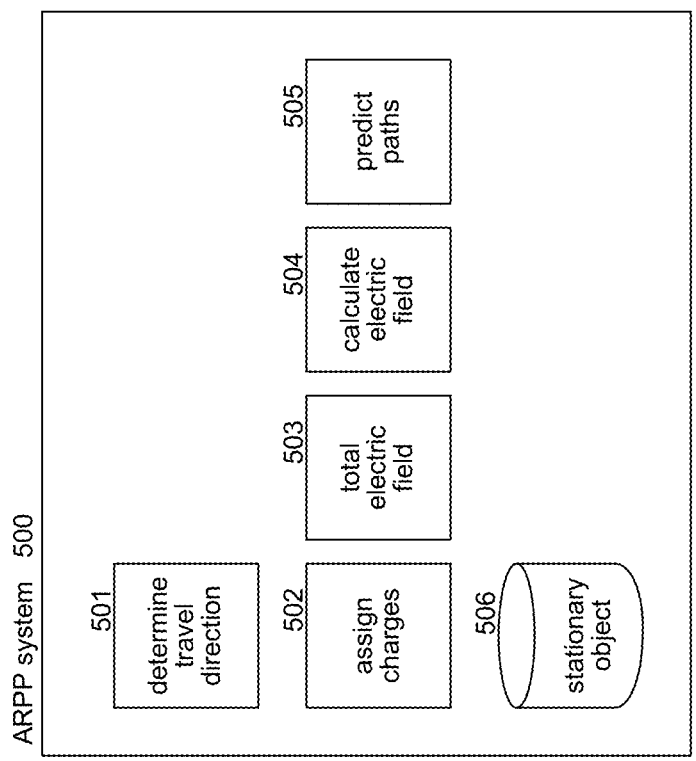
FIG. 5 is a block diagram illustrating components of the ARPP system in some embodiments.

FIG. 5 is a block diagram illustrating components of the ARPP system in some embodiments. An ARPP system 500 includes a determine travel direction component 501, an assign charges component 502, a total electric field component 503, a calculate electric field component 504, and a predict paths component 505. The ARPP system also includes a "stationary object" store 506 that stores information relating to stationary objects in the field of engagement. The determine travel direction component determines the next travel direction for a vehicle based on the current location, the target location, and the object locations. The assign charges component assigns electrostatic charges as repel values and an attract value to the object locations and the target location. The total electric field component calculates the total electric field as the attract-repel field at the current location. The calculate electric field component calculates the electric field as a repulsive force or an attractive force at the current location based on the charge assigned to a location. The predicted paths component generates predictions for object locations.

Figure 6:
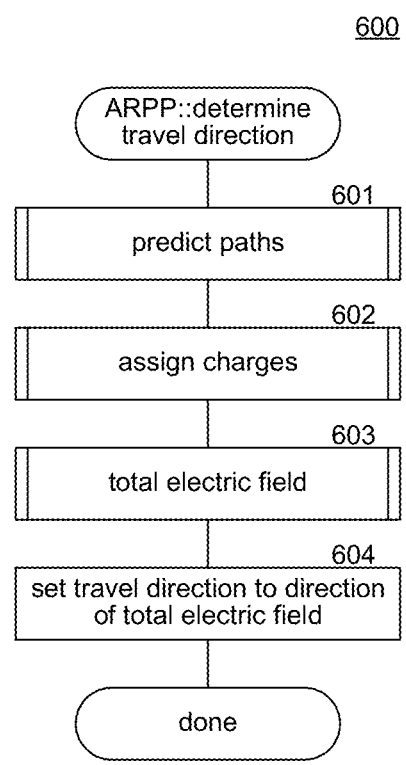
FIG. 6 is a flow diagram that illustrates processing of a travel direction component of the ARPP system in some embodiments.

FIG. 6 is a flow diagram that illustrates processing of a travel direction component of the ARPP system in some embodiments. A travel direction component receives a target location, a current location, and object locations and determines a next travel direction for the vehicle at the current location using an electrostatic charge-based model for the attract-repel model. In block 601, the component invokes the predict paths component to generated predicted locations of the objects. In block 602, the component invokes an assigned charges component to assign repel values to the object locations and an attract value to the target location. In block 603, the component invokes a total electric field component to generate an attract-repel field for the current location. In block 604, the component sets the travel direction to the direction of the attract-repel field and then completes.

Figure 7:
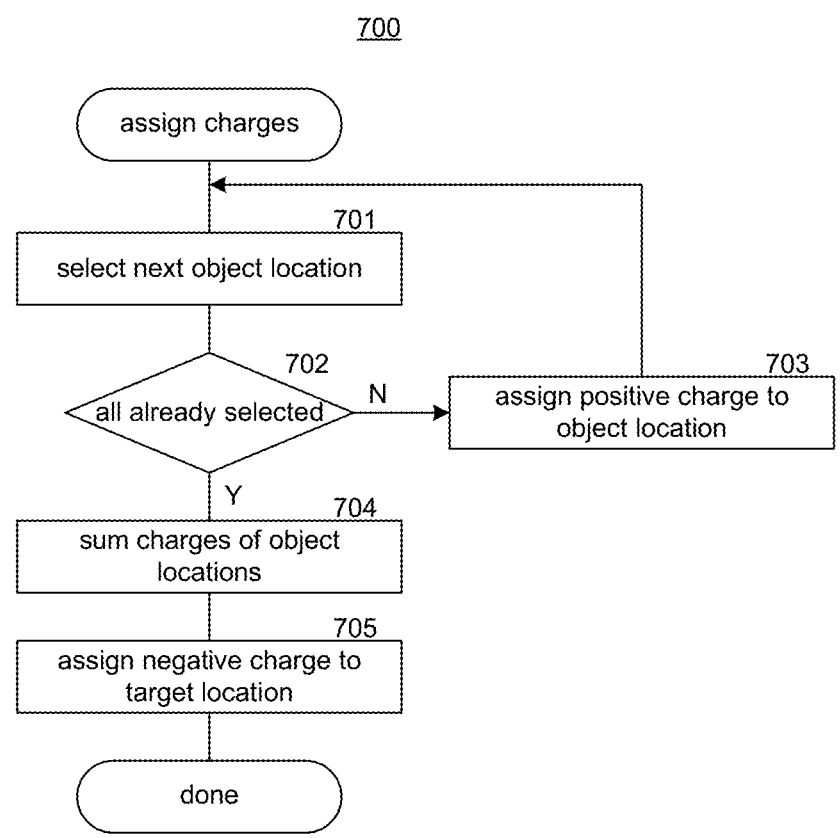
FIG. 7 is a flow diagram that illustrates the processing of the assign charges component of the ARPP system in some embodiments.

FIG. 7 is a flow diagram that illustrates the processing of the assign charges component of the ARPP system in some embodiments. An assign charges component 700 assigns quantities of an electrostatic charge to each object location and the target location to represent the repel values and the attract value. In block 701, the component selects the next object. In decision block 702, if all the objects have already been selected, then the component continues at block 704, else the component continues at block 703. In block 703, the component assigns a quantity of a positive charge to the object location of the selected object and loops to block 702 to select the next object. In block 704, the component totals the quantities of the positive charges assigned to the object locations. In block 705, the component assigns a quantity of a negative charge to the target location based on the total of the quantities of the positive charges assigned to the object locations. The component then completes.

Figure 8:
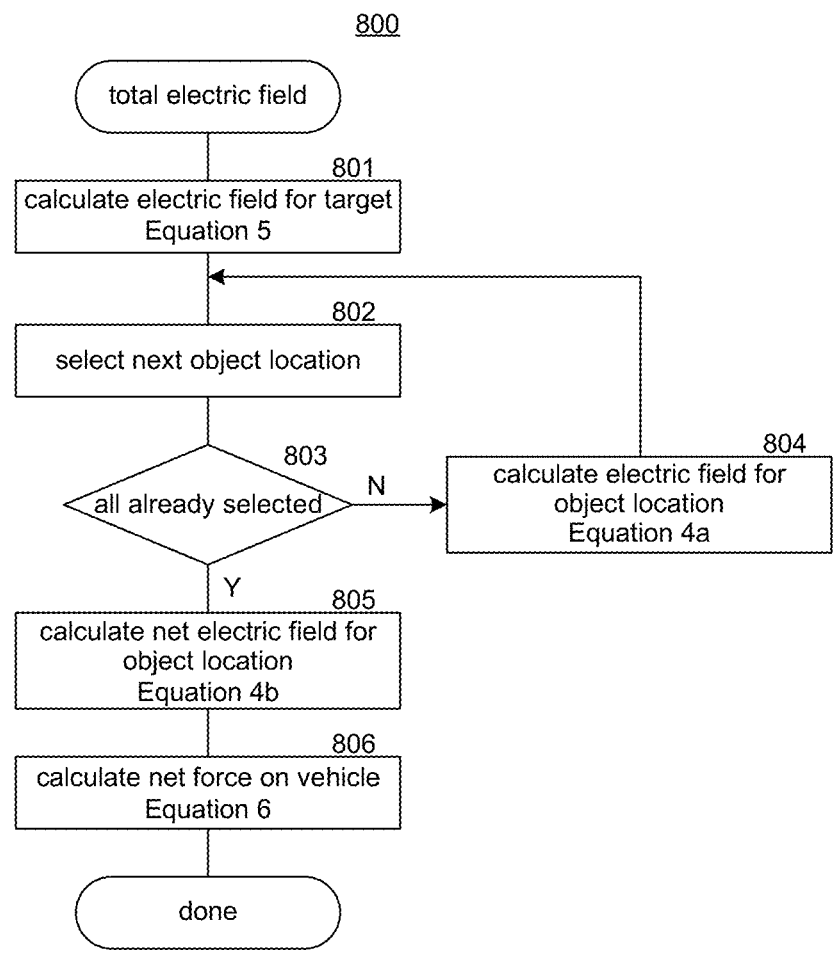
FIG. 8 is a flow diagram that illustrates processing of a total electric field component of the ARPP system in some embodiments.

FIG. 8 is a flow diagram that illustrates processing of a total electric field component of the ARPP system in some embodiments. A total electric field component 800 calculates the total electric field for the current location based on the positive and negative charges assigned to the object locations and the target location. In block 801, the component invokes a calculate electric field component to calculate the electric field at the current location attributable to the negative charge at the target location (Equation 5). In block 802, the component selects the next object location (current and predicated locations). In decision block 803, if all the object locations have already been selected, then the component continues at block 805, else the component continues at block 804. In block 804, the component calculates the electric field at the current location based on the positive charge of the object location (current or predicted) of the selected object (Equation 4a). The component then loops to block 802 to select the next object location. In block 805, the component calculates the total electric field based on the objects (Equation 4b). In block 806, the component generates a summation of the electric fields to generate a net force on the vehicle and then completes (Equation 6).

Figure 9:
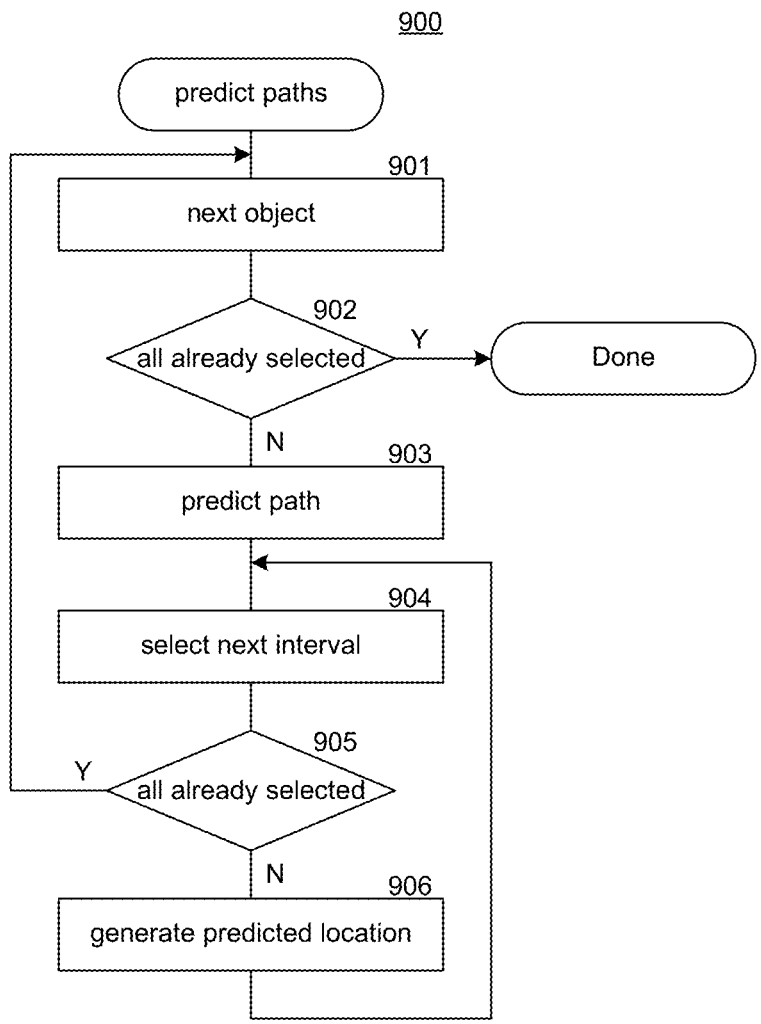
FIG. 9 is a flow diagram that illustrates the processing of a predict path component of the ARPP system in some embodiments.

FIG. 9 is a flow diagram that illustrates the processing of a predict path component of the ARPP system in some embodiments. A predict paths component 900 predicts the paths for objects and determines the predicted object locations. In block 901, the component selects the next object. In decision block 902, if all the objects have already been selected, the component completes, else the component continues at block 903. In block 903, the component predicts the path of the object. In block 904, the component selects the next prediction interval. In decision block 905, if all the prediction intervals have already been selected, then the component loops to block 901 to select the next object. In block 906, the component generates the prediction location for the selected object at the selected prediction interval and then loops to block 904 to select the next prediction interval.

The following paragraphs describe various embodiments of aspects of the OSA system. An implementation of the OSA system may employ any combination of the embodiments. The processing described below may be performed by a computing device with a processor that executes computer-executable instructions stored on a computer-readable storage medium that implements the OSA system.

In some embodiments, a computing system for identifying a travel direction that avoids objects when traveling from a current location to a target location is provided. The computing system comprises one or more computer-readable storage media storing computer-executable instructions and one or more processors for executing the computer-executable instructions stored in the one or more computer-readable storage media. The computer-executable instructions, when executed, control the computing device to, for each of a plurality of intervals perform the following processing. The processing receives object locations of objects. The object locations are identified from return signals of signals transmitted by a sensor array, and each object location specifying a single point. The processing assigns a repel value to the object location of each object, the repel value indicating a repulsive force exerted in a direction from the object location to the current location. The processing assigns an attract value to the target location, the attract value indicating an attractive force exerted in a direction of the current location to the target location. The processing calculates an attract-repel field for the current location based on the repulsive forces and their directions and the attractive force and its direction. The attract-repel field is a vector with a direction. The processing also indicates that the travel direction is in the direction of attract-repel field. In some embodiments, the attract-repel field for the current location is calculated based on the repulsive forces and the attractive force exerted on the current location. In some embodiments, a force exerted on the current location that is based on a value assigned to a location is determined based on a force law and the assigned value and the distance between the current location and that location. In some embodiments, a force exerted on the current location that is based on a value assigned to a location monotonically decreases based on distance from that location. In some embodiments, a force exerted on the current location that is based on a value assigned to a location exponentially decreases based on distance from that location. In some embodiments, the attract value varies based on risk tolerance of avoiding objects. In some embodiments, the repel values vary based on risk tolerance of avoiding objects. In some embodiments, the magnitude of the repel value assign to an object location varies based on an object uncertainty. In some embodiments, the travel direction is determined at intervals and object locations of a prior interval are available in a current interval so that the travel direction is determined for the current interval based on a repel value assigned to a prior object location of the prior interval even though the prior object location is not otherwise available for the current interval. In some embodiments, the repel value assigned to the prior object location decays over time.

In some embodiments, a method performed by a computing system for determining a travel direction that avoids objects when traveling from a current location to a target location is provided. For each of a plurality of intervals during travel to the target location, the method transmits signals from a sensor array. The method receives return signals. The return signals are the transmitted signals that are reflected by objects. The method determines a location of each object, each location specifying a point. The method assigns a quantity of an object charge to the location of each object. The method assigns a quantity of a target charge to the target location, wherein the object charge and the target charge are opposite charges. The method calculates a total field at the current location resulting from the quantities of the object charge and the quantity of the target charge. The total field has a direction. The method indicates that the travel direction is the determined direction. In some embodiments, the calculating of the total field at the current location comprises for each assigned quantity, calculating a field resulting from the assigned quantities and summing the calculated fields. In some embodiments, the fields represent electric fields that are based on a force law. In some embodiments, the field for a charge monotonically varies based on distance from the location of the charge. In some embodiments, the field for a charge exponentially varies based on distance from the location of the charge. In some embodiments, the absolute value of the sum of the quantities of the object charge assigned to the locations of the objects is equal to the quantity of the target charge assigned to the target location. In some embodiments, the quantity of the target charge assigned to the target location is increased so that determined travel direction is closer to the direction from the current location to the target location. In some embodiments, the quantity of the target charge assigned to the location of the target is decreased so that the determined travel direction is farther from the direction from the current location to the target location. In some embodiments, the quantities of the object charge assigned to the locations of the objects vary based on an object uncertainty. In some embodiments, the determining of the travel direction is performed at intervals and object locations from a prior interval are available in a current interval so that the travel direction is determined for the current interval based on a prior object whose object location was received for the prior interval even though the object location of the prior object was not received for the current interval. In some embodiments, the quantity of an object charge assigned to the prior object decays over time.

In some embodiments, a method performed by a computing system for determining a travel direction to avoid objects when traveling from a current location to a target location is provides. For each of a plurality of intervals during travel to the target location, the method receives object locations of objects. The object locations are identified from return signals of signals transmitted by a sensor array, and each object location specifies a point. For each pair of neighboring empty locations, the method provides an environmental measure associated with traveling between the empty locations when traveling to the target location. The environmental measures are based on object locations near a pair of neighboring empty locations. The method identifies a waypoint location along a travel path from the current location to the target location. The travel path is determined based on the environmental measures. The method receives locations of objects. The method assigns a quantity of an object charge to the location of each object. The method assigns a quantity of a waypoint charge to the waypoint location, wherein the object charge and the waypoint charge are opposite charges. The method calculates a total field at the current location resulting from the quantities of the object charge and the quantity of the waypoint charge. The total field has a direction. The method indicates that the travel direction is the determined direction. In some embodiments, the travel path is determined by applying a minimal cost path algorithm to a cost graph representation of reference locations where vertices represent locations, edges between vertices represent that the locations of the vertices are neighbors, and costs derived from the environmental measures are associated with the edges. In some embodiments, the environmental measures are based on locations of stationary objects to be avoided. In some embodiments, the environmental measures associated with stationary objects are calculated prior to travel and the environmental measures associated with moving objects are calculated during travel. In some embodiments, the environmental measures are selected from a group consisting of a transform distance measure, an object density measure, and a zone permeability measure. In some embodiments, the determining of the environmental measures associated with moving objects is performed during travel of a vehicle at time intervals. In some embodiments, a time interval is adjusted based on risk tolerance of a vehicle colliding with an object. In some embodiments, the environmental measures are based on locations of objects that are within a remote distance of a location. In some embodiments, the remote distance is adjusted based on risk tolerance of a vehicle colliding with an object.

In some embodiments, one or more computing systems are provided for identifying a travel direction that avoids objects when traveling from a current location to a target location. The one or more computing systems include one or more computer-readable storage media storing computer-executable instructions and one or more processors for executing the computer-executable instructions stored in the one or more computer-readable storage media. The instructions, when executed, control the one or more computing systems to perform the following for each of a plurality of intervals. The instructions receive object locations of detected objects, the object locations being identified from return signals of signals transmitted by a sensor array. Each object location specifies a single point. The instructions receive external object information provided by an external object system. The external object information for objects that object location, speed, and type of objects. The instructions assign a repel value to the object location of each object. The repel value indicates a repulsive force exerted in a direction from the object location to the current location, at least some of the repel values being based on speeds and types provided by the external object system. The instructions assign an attract value to the target location. The attract value indicates an attractive force exerted in a direction of the current location to the target location. The instructions calculate an attract-repel field for the current location based on the repulsive forces and their directions and the attractive force and its direction. The attract-repel field is a vector with a direction. The instructions indicate that the travel direction is in the direction of the attract-repel field. In some embodiments, the external object system is an unmanned aircraft traffic management system. In some embodiments, the external object information includes direction of travel of objects. In some embodiments, the external object system provides information on objects in a building. In some embodiments, the instructions further include instructions that predict paths of objects and assign repel values to predicted locations along the predicted paths. In some embodiments, the repel values for predicted locations of an object decrease with distance from current location of the object. In some embodiments, the repel value for an object location is further based on status of an object provided by the external object information. In some embodiments, the travel direction is determined at intervals and object locations of a prior interval are available in a current interval so that the travel direction is determined for the current interval based on a repel value assigned to a prior object location of the prior interval even though the prior object location is not otherwise available for the current interval. In some embodiments, the external object information is stored in a datacenter and the instructions that receive the external object information retrieve the external object information from the datacenter. In some embodiments, the datacenter is a cloud-based datacenter. In some embodiments, the one or more computing systems are external to a vehicle traveling from the current location to the target location. In some embodiments, the instructions further control the one or more computing systems to send the travel direction to the vehicle.

In some embodiments, a method performed by one or more computing systems is provided for determining a travel direction that avoids objects when traveling from a current location to a target location. The method performs the following for each of a plurality of collection intervals during travel to the target location. The method accesses external object information provided by an external object system. The external object information including, for each of a plurality of objects, location, type, and constraint. The method assigns a quantity of an object charge to the location of each object based on the type of and constraint on the object. The method assigns a quantity of a target charge to the target location, wherein the object charge and the target charge are opposite charges. The method calculates a total field at the current location resulting from the quantities of the object charge and the quantity of the target charge. The total field has a direction. The method indicates that the travel direction is the determined direction. In some embodiments, the external object system is an unmanned aircraft traffic management system. In some embodiments, the objects include unmanned vehicles in a building. In some embodiments, the method further predicts paths of objects and assigning a quantity of charge to predicted locations along the predicted paths. In some embodiments, the one or more computing systems are cloud-based computing systems. In some embodiments, the method further comprises receiving an indication of the current location and sending the indicated travel direction to a vehicle traveling from the current location to the target location.

In some embodiments, A method performed by one or more computing systems is provided for determining a travel direction for a vehicle to avoid objects when traveling from a current location to a target location. The method performs the following for each of a plurality of objects. The method accesses an object location. The method predicts a path for the object based on the object location. The method designates locations along the path as predicted locations for the object. The method assigns repulsive forces to the object location of the object and the predicted locations. The method assigns an attractive force to the target location. The method assigns a cumulative force on the current location based on the attractive force and the repulsive forces. The method sets the travel direction based on the cumulative force. In some embodiments, the objects include objects detected by sensors onboard the vehicle and objects identified by an external object system. In some embodiments, the repulsive force assigned to predicted locations for an object decreases with distance from the object location of the object. In some embodiments, the target location is a location of a moving target object and further comprising predicting a target path for the target object, designating locations along the path as predicted locations for the target object, and assigning attractive forces to the predicted locations of the target object, and the cumulative force is further based on the predicted locations of the target object. In some embodiments, the repulsive force assigned to an object varies based on type of the object. In some embodiments, the repulsive force assigned to an object varies based on a constraint of the object. In some embodiments, the repulsive force assigned to an object varies based on uncertainty in the object location. In some embodiments, the objects include objects detected by an unmanned vehicle traffic system. In some embodiments, the object location of an object is detected by a sensor external to the vehicle. In some embodiments, the sensor is a LIDAR sensor. In some embodiments, the sensor is a RADAR sensor. In some embodiments, the accessing of an object location includes for at least some of the objects accessing external object information. In some embodiments, the external object information is stored in a datacenter.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the aspects described by the claims. Accordingly, the invention is not limited except as by the appended claims.

We claim:

1. One or more computing systems for identifying a travel direction for a vehicle to avoid objects, the one or more computing systems comprising:
one or more computer-readable storage media storing computer-executable instructions that, when executed, control the one or more computing systems to, for each of a plurality of intervals:
receive object locations of detected objects, the object locations being identified from return signals of signals transmitted by a sensor array, each object location specifying a single point;
receive external object information provided by an external object system, the external object information for objects includes object location, speed, and type of objects;
assign a repel value to the object location of each object, the repel value indicating a repulsive force exerted in a direction from the object location to a current location of the vehicle, at least some of the repel values being based on speeds and types provided by the external object system;
predict a target location of a moving target object, the predicted target location being one of a plurality of predicted target locations of the target object designated along a predicted target path of the target object;
assign an attract value to the target location, the attract value indicating an attractive force exerted in a direction from the current location to the target location;
calculate an attract-repel field for the current location based on the repulsive forces and their directions and the attractive force and its direction, the attract-repel field being a vector with a direction;
cause the travel direction of the vehicle to be set in the direction of the attract-repel field; and
control the vehicle to travel in the travel direction;
and one or more processors for executing the computer-executable instructions stored in the one or more computer-readable storage media.

2. The one or more computing systems of claim 1 wherein the external object system is an unmanned aircraft traffic management system.

3. The one or more computing systems of claim 1 wherein the external object information includes direction of travel of objects.

4. The one or more computing systems claim 1 wherein the external object system provides information on objects in a building.

5. The one or more computing systems of claim 1 wherein the instructions further include instructions to predict paths of the objects other than the target object and assign repel values to predicted locations along the predicted paths.

6. The one or more computing systems of claim 5 wherein the repel values for predicted locations of an object decrease with distance from current location of the object.

7. The one or more computing systems of claim 1 wherein the repel value for an object location is further based on status of an object provided by the external object information.

8. The one or more computing systems of claim 1 wherein the travel direction is determined at intervals and object locations of a prior interval are available in a current interval so that the travel direction is determined for the current interval based on a repel value assigned to a prior object location of the prior interval even though the prior object location is not otherwise available for the current interval.

9. The one or more computing systems of claim 1 wherein the external object information is stored in a datacenter and the instructions that receive the external object information retrieve the external object information from the datacenter.

10. The one or more computing systems of claim 9 wherein the datacenter is a cloud-based datacenter.

11. The one or more computing systems of claim 1 wherein the one or more computing systems are external to a vehicle traveling from the current location to the target location.

12. The one or more computing systems of claim 11 wherein the instructions further control the one or more computing systems to send the travel direction to the vehicle.

13. A method performed by one or more computing systems for determining a travel direction that avoids objects when traveling from a current location to a target location, the method comprising:
 for each of a plurality of collection intervals during travel to the target location,
  accessing external object information provided by an external object system, the external object information including, for each of a plurality of objects, location, type, and constraint;
  assigning a quantity of an object charge to the location of each object based on the type of and constraint on the object;
  predicting the target location, the target location corresponding to one of a plurality of predicted target locations of a moving target object corresponding to a predicted target path of the target object;
  assigning a quantity of a target charge to the target location, wherein the object charge and the target charge are opposite charges;
  calculating a total field at the current location resulting from the quantities of the object charge and the quantity of the target charge, the total field having a direction; and
  control a vehicle to travel in the determined direction.

14. The method of claim 13 wherein the external object system is an unmanned aircraft traffic management system.

15. The method of claim 13 wherein the objects include unmanned vehicles in a building.

16. The method of claim 13 further comprising predicting paths of objects and assigning a quantity of charge to predicted locations along the predicted paths.

17. The method of claim 13 wherein the one or more computing systems are cloud-based computing systems.

18. The method of claim 17 wherein the method further comprises receiving an indication of the current location and sending an indication of the determined direction to a vehicle traveling from the current location to the target location.

19. A method performed by one or more computing systems for determining a travel direction of a vehicle to enable the vehicle to avoid objects when traveling from a current location to a target location, the method comprising:
 predicting a target path of a moving target object;
 designating locations along the target path as predicted locations of the target object;
 assigning attractive forces to the predicted locations of the target object;
 for each of a plurality of objects other than the target object,
  accessing an object location;
  predicting a path for the object based on the object location;
  designating locations along the path as predicted locations for the object; and
  assigning repulsive forces to the object location of the object and the predicted locations;
 assigning an attractive force to the target location; and
 assigning a cumulative force on the current location based on the attractive force, the repulsive forces and the predicted locations of the target object;
 setting the travel direction of the vehicle based on the cumulative force; and
 controlling the vehicle to travel in the travel direction.

20. The method of claim 19 wherein the objects include objects detected by sensors onboard the vehicle and objects identified by an external object system.

21. The method of claim 19 wherein the repulsive force assigned to predicted locations for an object decreases with distance from the object location of the object.

22. The method of claim 19 wherein the repulsive force assigned to an object varies based on type of the object.

23. The method of claim 19 wherein the repulsive force assigned to an object varies based on a constraint of the object.

24. The method of claim 19 wherein the repulsive force assigned to an object varies based on uncertainty in the object location.

25. The method of claim 19 wherein the objects include objects detected by an unmanned vehicle traffic system.

26. The method of claim 19 wherein the object location of an object is detected by a sensor external to the vehicle.

27. The method of claim 26 wherein the sensor is a LIDAR sensor.

28. The method of claim 26 wherein the sensor is a RADAR sensor.

29. The method of claim 19 wherein the accessing of an object location includes for at least some of the objects accessing external object information.

30. The method of claim 29 wherein the external object information is stored in a datacenter.

\* \* \* \* \*